United States Patent
Kokubun

(10) Patent No.: US 6,408,055 B1
(45) Date of Patent: Jun. 18, 2002

(54) ELECTRONIC MAIL POP-UP CONTROL SYSTEM

(75) Inventor: Hisami Kokubun, Koriyama (JP)

(73) Assignee: Hitachi Telecom Technologies, Ltd., Koriyama (JP)

( * ) Notice: Subject to any disclaimer, the term of this patent is extended or adjusted under 35 U.S.C. 154(b) by 0 days.

(21) Appl. No.: 09/284,991

(22) PCT Filed: Sep. 17, 1998

(86) PCT No.: PCT/JP98/04186

§ 371 (c)(1),
(2), (4) Date: Jun. 10, 1999

(87) PCT Pub. No.: WO99/14677

PCT Pub. Date: Mar. 25, 1999

(30) Foreign Application Priority Data

Sep. 17, 1997 (JP) .............................. 9-270599

(51) Int. Cl.[7] ......................... H04M 1/64; H04M 11/00; H04M 3/42; H04M 3/00
(52) U.S. Cl. ................. 379/67.1; 379/88.11; 379/93.21; 379/202.01; 379/205.01; 379/207.01; 379/211.02; 379/158; 379/212.01; 379/265.06
(58) Field of Search ........................... 379/67.1, 70, 76, 379/88.11, 88.12, 88.21, 93.21, 265, 48, 88.18, 93.12, 93.13, 93.35, 142.08, 157, 158, 201.01, 202.01, 205.01, 207.01, 208.01, 209.01, 210.01, 211.02, 212.01, 265.01, 265.06, 265.11

(56) References Cited

U.S. PATENT DOCUMENTS

| | | | | |
|---|---|---|---|---|
| 5,742,670 A | * | 4/1998 | Bennett | 379/142 |
| 5,757,904 A | * | 5/1998 | Anderson | 379/265 |
| RE36,354 E | * | 10/1999 | Cotton et al. | 379/157 |
| 5,970,122 A | * | 10/1999 | LaPorta et al. | 379/67.1 |
| 6,091,956 A | * | 7/2000 | Hollenberg | 455/456 |

FOREIGN PATENT DOCUMENTS

| | | |
|---|---|---|
| JP | 6-149692 | 5/1994 |
| JP | 6-243060 | 9/1994 |
| JP | 7-253942 | 10/1995 |
| JP | 9-114763 | 5/1997 |

* cited by examiner

*Primary Examiner*—Allan Hoosain
(74) *Attorney, Agent, or Firm*—Foley & Lardner

(57) ABSTRACT

An electronic mail pop-up control system in a dealing system for lightening a burden on a dealer handling a large amount of information at the same time by reducing the number of operations to be done on a dealing talk terminal, said control system lightening a burden on a dealer by displaying an electronic mail which is one of means for exchanging information between talking terminals 1 on a display 1–26 of a called side talking terminal 1 without any operation performed by a dealer at the called side.

3 Claims, 9 Drawing Sheets

ELECTRONIC MAIL POP-UP CONTROL SYSTEM

TECHNICAL FIELD

The present invention relates to improvement of a dealing system used when a bank or a securities company performs a financial transaction of exchange, securities and the like.

BACKGROUND TECHNOLOGY

Up to now, an electronic mail system for transferring a simple message between such talking terminals as dealing boards and the like which are connected with a line control unit transfers a message inputted from a keyboard of a calling side talking terminal to a called side talking terminal, blinks a message lamp of the called side talking terminal, and thereby notifies a dealer who is the called party that a message comes in, and then displays the message in an electronic mail display window on a display device only when this called party operates a message key.

In a conventional system as described above, however, if a called party does not operate a message key, a message cannot be displayed on a display device, and it is conceivable that the called party suffers loss of an opportunity due to a fact that the called party has overlooked blinking of a message lamp or has operated the message key too late.

The present invention has been performed in order to solve such an existing problem, and an object of the invention is to provide an electronic mail pop-up control system capable of automatically displaying a message on a display of a called side talking terminal even without performing any operation on the called side talking terminal.

DISCLOSURE OF THE INVENTION

In order to attain the above-mentioned object, an electronic mail pop-up control system according to claim 1 of the present invention is characterized by a fact that said system has a plurality of talking terminals and a line control unit being communication-connected with these talking terminals, wherein each of said talking terminals has a message input means for inputting a message and a display means for displaying a message, a first talking terminal out of these plurality of talking terminals transfers a message inputted by the message input means of the first talking terminal to a second talking terminal, and when the second talking terminal out of these plurality of talking terminals receives the message from the first talking terminal, the second talking terminal automatically pops up and displays an electronic mail display window at the forefront of a display screen on a display means of the second talking terminal and displays the message transferred from said first talking terminal in this electronic mail display window.

Said talking terminal corresponds to a dealing board used in a financial transaction, for example.

Said first talking terminal corresponds to a calling side talking terminal and said second talking terminal corresponds to a called side talking terminal, and the first and second talking terminals are made so as to have the same internal composition as each other. Additionally, said plurality of talking terminals means two or more talking terminals.

Said line control unit is composed of such a switching system as a speech path switch and the like for communication-connecting a plurality of talking terminals to each other and communication-connecting these talking terminals and a public network with each other, for example.

Said message input means corresponds to a keyboard, a mouse or the like for inputting the content of a message of an electronic mail, for example.

Said display means corresponds to a display device which is provided with a pagination function for displaying the name of an accommodated circuit and a message content for example and additionally is provided with a pop-up function for displaying an electronic mail display window at the forefront of its display screen.

Said electronic mail display window is a window for automatically displaying a message transferred from the first talking terminal, for example.

According to an electronic mail pop-up control system as defined in claim 1 of the present invention, therefore, when a second talking terminal receives a message from a first talking terminal, the second talking terminal pops up and displays an electronic mail display window at the forefront of a display screen on a display means of the second talking terminal and displays the message from the first talking terminal in this electronic mail display window, and therefore it is possible to completely prevent that a called party suffers loss of an opportunity due to a fact that the called party has overlooked a message from the first talking terminal or has performed a message key operation too late, and remarkably reduce a burden on a dealer who is the called party performing a transaction fighting the clock.

And an electronic mail pop-up control system according to claim 2 of the present invention is characterized by a fact, in addition to the composition as defined in said claim 1, that said talking terminal comprises a storage means for storing a plurality of definite-form reply messages in it and a selecting means for selecting a definite-form reply message stored in this storage means and an optional definite-form reply message out of definite-form reply messages stored in this storage means, and said second talking terminal displays a message from the first talking terminal in an electronic mail display window and then, when an optional definite-form reply message is selected by said selecting means, automatically transfers this optional definite-form reply message to the first talking terminal.

Said storage means stores a plurality of definite-form reply messages.

Said selecting means is a means for selecting an optional definite-form reply message from definite-form reply messages stored in said storage means, for example, a means corresponding to a mouse, a keyboard or the like for selecting an optional definite-form reply message on a screen from a plurality of definite-form reply messages displayed on the display screen of a display device.

According to an electronic mail pop-up control system as defined in claim 2 of the present invention, therefore, since each of talking terminals stores several kinds of definite-form reply messages in it, in addition to the effect described in said claim 1, the called party who is a user of the second talking terminal can save a trouble of inputting various messages by selecting an optional definite-form reply message by means of the selecting means, and thanks to this it is possible to remarkably reduce a burden on a dealer who is a called party.

And an electronic mail pop-up control system according to claim 3 of the present invention characterized by a fact, in addition to the composition as defined in said claim 2, that when the first talking terminal receives a definite-form reply message from said second talking terminal, the first talking terminal automatically pops up and displays an electronic mail display window at the forefront of a display screen of a display means of the first talking terminal and displays the definite-form reply message transferred from said second talking terminal in this electronic mail display window.

According to an electronic mail pop-up control system as defined in claim 3 of the present invention, therefore, since it automatically pops up and displays an electronic mail display window at the forefront of a display screen of the display means of the first talking terminal and displays a definite-form reply message transferred from said second talking terminal in this electronic mail display window, the caller who is a user of the calling side talking terminal can also read the definite-form reply message without performing a key operation, and it is possible to reduce a burden on the dealer who is a caller originating the message.

BEST EMBODIMENT FOR IMPLEMENTING THE INVENTION

Figure 1:
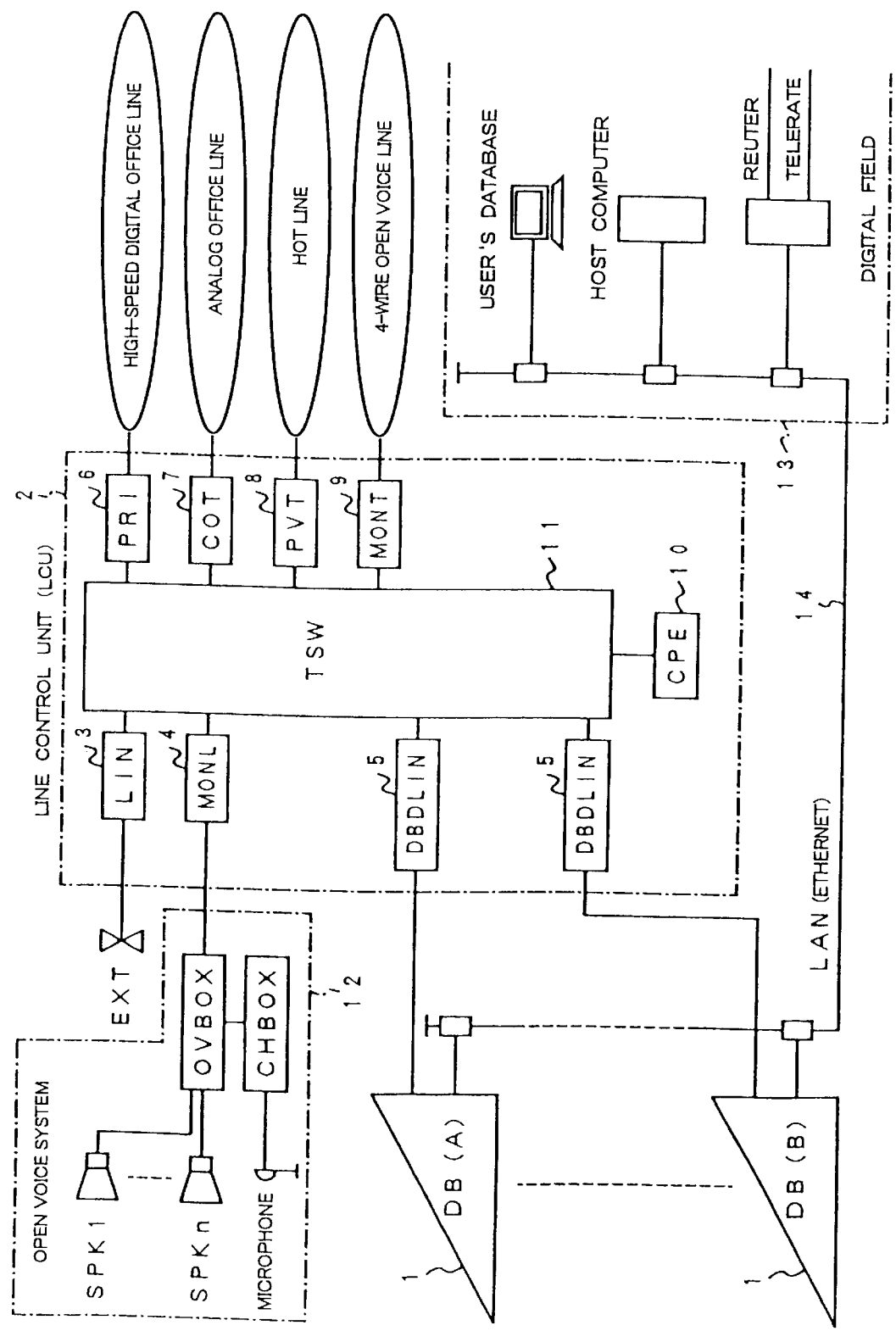
FIG. 1 is a block diagram roughly showing the composition of a dealing system showing an embodiment of an electronic mail pop-up control system of the present invention.

FIG. 1 is an example of a block diagram roughly showing the composition of a dealing system showing an embodiment of the present invention.

Number 1 is a talking terminal (DB) called a dealing board and is an apparatus being most closely related to the present invention, and several tens to several hundreds of such talking terminals 1 are accommodated in a single dealing system.

Number 2 is a line control unit (LCU), which plays a role of a switching system in a dealing system. In this case it is assumed that a time-division switching system is adopted. Number 3 is a line circuit (LIN) for connecting an ordinary extension telephone to the line control unit 2. Number 4 is a 4-wire monitor line circuit (MONL) dedicated to an open voice system which outputs information from a speaker at ordinary times. Number 5 is a digital talking terminal line circuit (DBDLIN) for connecting a talking terminal (DB) 1 and the line control unit (LCU) 2 to each other.

Number 6 is a central office line trunk (PRI) for connecting the LCU 2 to a high-speed digital office line such as a primary digital stage rate line of ISDN. Number 7 is a central office trunk (COT) for connecting the LCU 2 to an ordinary analog office line. Number 8 is a private line trunk for a private line being used as a hot line. Number 9 is a trunk used for a 4-wire open voice line (MONT) and is connected to a private line.

Number 10 is a central processing equipment (CPE) of the line control unit (LCU) 2 for performing a switching connection by controlling a time-division switch (TSW) described in the following. Number 11 is a time-division switch (TSW) for interconnecting various line circuits and trunk circuits.

Number 12 is an open voice system already described, which is composed of an n number of monitor speakers (SPK1 to SPKn), and a microphone for transmission, and they are, respectively, connected to an open voice box (OVBOX) and a transmission switching box (CHBOX), and the transmission switching box (CHBOX) is connected to the open voice box (OVBOX). And the open voice box (OVBOX) is connected to a talking terminal (DB) 1 needed according to work.

Number 13 is called a digital field in which a user's database, a host computer and data from such news media as Reuter, Telerate and the like are linked with a local area network (LAN), and is an information source for talking terminals (DB) 1.

Number 14 is a local area network (LAN) for connecting various information sources in said digital field to talking terminals (DB) 1 and this embodiment uses an Ethernet.

In FIG. 1, a talking terminal (DB) 1 has connecting paths to the line control unit (LCU) 2 and to the local area network (LAN) 14.

Each talking terminal (DB) 1 is connected through a digital talking terminal line circuit (DBDLIN) 5 to the line control unit (LCU) 2, and can be connected, by dialing or pressing a line connection key, to another talking terminal (DB) 1, an ordinary extension (ETX), a high-speed office line, an analog office line, a hot line and the like.

And each talking terminal (DB) 1 can access the digital field 13 through the LAN 14, download necessary data, and input contract data into a host computer.

Since a talking terminal (DB) 1 is a dealing board used when a dealer of a bank or a securities company performs a financial transaction of exchange, securities and the like, it needs to be able to quickly collect information related to transactions and perform a speedy contact with an interested party.

Therefore, in case that some information has come into a talking terminal (DB) 1, for example, a talking terminal (DB(A)) 1 from another information source when the talking terminal (DB(A)) 1 is talking, if a talking terminal (DB(B)) is free, it is necessary that a dealer of the talking terminal (DB(B)) 1 responds instead and notifies at once a dealer of the talking terminal (DB(A)) 1 of the matter of business.

For such an object, an electronic mail has been used up to now, but as described in the section of Background Technology, when incoming of an electronic mail is indicated in the talking terminal (DB(A)) 1, unless the dealer of the talking terminal (DB(A)) 1 knows the incoming indication and performs a response operation, the message has not been displayed, and therefore the dealer has sometimes overlooked the incoming indication or responded to it too late.

Figure 2:
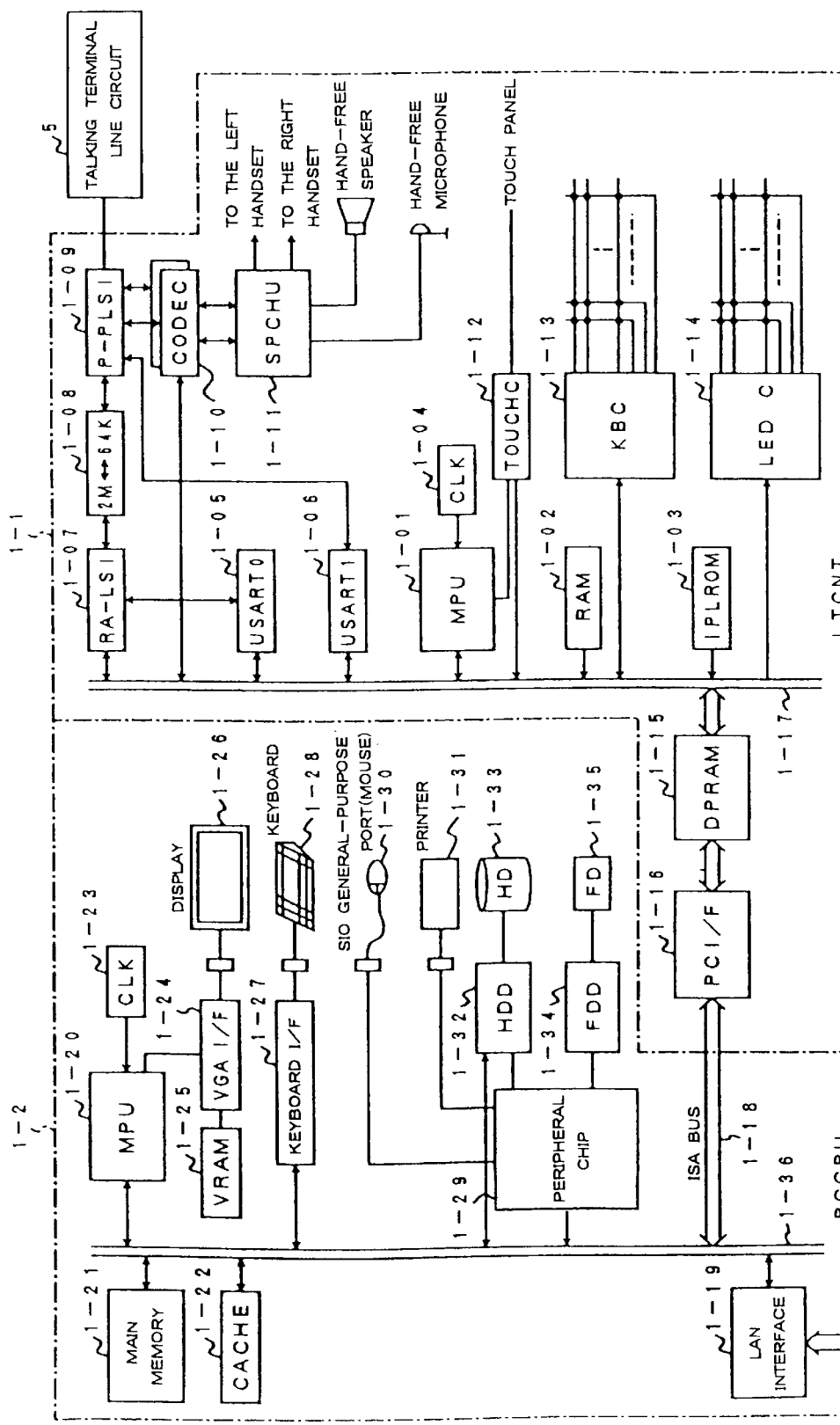
FIG. 2 is a block diagram roughly showing an internal composition of a talking terminal in a dealing system shown in this embodiment.

FIG. 2 is a block diagram roughly showing an internal composition of a talking terminal (DB) 1.

The talking terminal (DB) 1 shown in FIG. 2 is composed of a line trunk controller (LTCNT) 1-1 and an information processing unit (PCCPU) 1-2 having a personal computer function or a workstation function.

These are controlled respectively by microprocessor units (MPU) 1-01 and 1-20, the former is a slave MPU and the latter is a master MPU in relation to control.

In FIG. 2, number 1-01 is a microprocessor unit (MPU) for controlling the line trunk controller (LTCNT) 1-1, number 1-02 is a random access memory (RAM for storing an online program and for work, 1-03 is a read-only memory (IPLROM) for having an initial program (IPL) loaded, and 1-04 is a clock generator (CLK).

Number 1-05 is a serial communication receiver/transmitter (USART0) for receiving and converting serial data of 19.2 Kbps from an RA-LSI performing a communication rate adoption described later to parallel data and connecting them to a bus 1-17 described later, and 1-06 is a serial communication receiver/transmitter (USART1) for converting serial data of 16 Kbps from a D channel in an ISDN circuit to parallel data and connecting them to the bus 1-17, and 1-07 is a communication rate adoption LSI (RA-LSI) for adapting a data transfer rate.

Number 1-08 is a device for converting transfer rates of 64 Kbps and 2 Mbps to each other, and 1-09 is a data transmission LSI (P-PLSI) for separating serial data of (2B+D) from a talking terminal line circuit 5 into channels B1, B2 and D, connecting the channels B1 and B2 to a CODEC 1-10 described next and connecting the channel D to the serial communication receiver/transmitter (USART1) 1-06 described already.

Number 1-10 is a CODEC, which is a device which converts a serial digital voice of 64 Kbps from the P-PLSI to an analog voice and inversely converts them.

Number 1-11 is a speech path control unit (SPCHU) and plays a role of controlling connection of analog voices from two CODECs 1-10 to two left and right handsets or a hand-free speaker and a hand-free microphone.

Number 1-12 is a touch panel controller (TOUCHC), 1-13 is a keyboard controller (KBC) and 1-14 is a controller (LEDC) for controlling to turn on light emitting diodes LEDs.

Number 1-15 is a dual port RAM (DPRAM) which is a shared memory capable of being accessed by the two MPU, and is used in transferring data between the microprocessor (MPU) 1-20 in the information processing unit (PCCPU) 1-2 and the microprocessor (MPU) 1-01 in the line trunk controller (LTCNT) 1-1, and 1-16 is an interface (PCI/F) between the dual port RAM (DPRAM) 1-15 and an ISA bus of the information processing unit (PCCPU) 1-2.

Number 1-17 is a bus of the line trunk controller (LTCNT) 1-1. Number 1-18 is an ISA bus and is used as a bus for connecting the microprocessor unit (MPU) 1-20 in the information processing unit (PCCPU) 1-2 and the microprocessor unit (MPU) 1-01 in the line trunk controller (LTCNT) 1-1. Number 1-19 is a LAN interface, which is connected to the LAN 14.

Number 1-20 is the microprocessor unit (MPU) of the information processing unit (PCCPU) 1-2, number 1-21 is a main memory, 1-22 is a cache memory (CACHE), and 1-23 is a clock generator (CLK).

Number 1-24 is a VGA interface (VGAI/F) for controlling a display device, and has a video RAM (VRAM) 1-25 and a display device 1-26 connected with it.

Number 1-27 is a keyboard interface (keyboard I/F) for connecting a full keyboard 1-28.

Number 1-29 is a peripheral chip for controlling peripheral devices, and controls a general-purpose serial port capable of connecting a mouse, a printer 1-31, a hard disk drive (HDD) 1-32, a floppy disk drive (FDD) 1-34 and the like.

The general-purpose serial I/O port has the mouse 1-30 connected which is a pointing device for pointing an optional position on a display, and a printer 1-31 can be optionally connected.

Number 1-32 is a hard disk drive (HDD) for driving and controlling a hard disk (HD) 1-33, and number 1-34 is a floppy disk drive for driving and controlling a floppy disk (FD) 1-35. Number 1-36 is a bus of the information processing unit 1-2.

Figure 3:
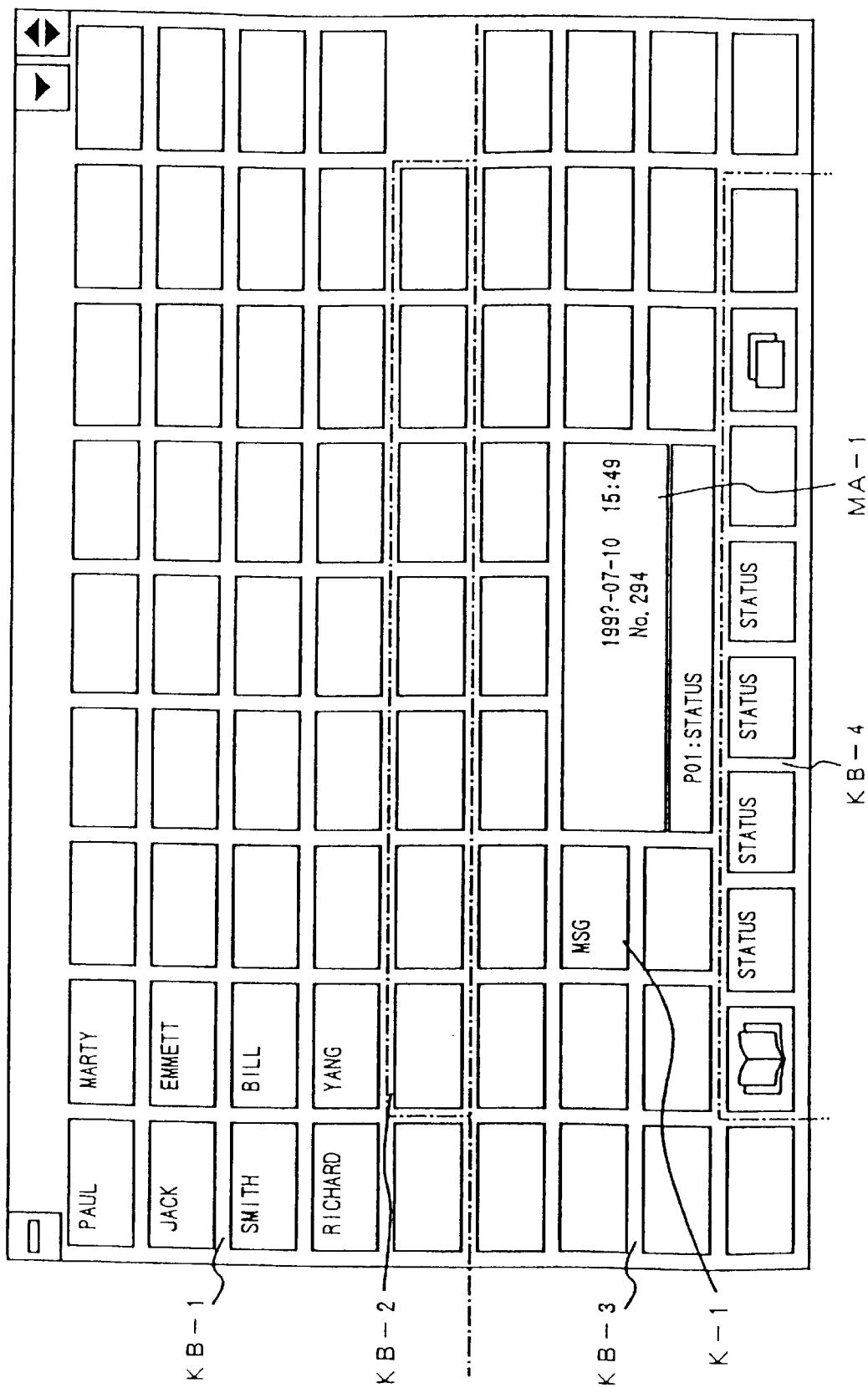
FIG. 3 is an explanatory figure showing a display screen of a display of a talking terminal in a state of using no electronic mail.

FIG. 3 is an example of a dealing screen displayed on the display device 1-26 and is a line display screen, in which a key block KB-1 enclosed by a long and short dash line represents a line lamp and key (hereinafter referred to as a key) block for registering various lines or automatic dialing, and is controlled by software. This line display screen has persons' names displayed in it.

This line key block has a pagination function comprising a plurality of pages and is devised so as to be able to cope with increase of the number of lines accessed by a talking terminal (DB) 1.

Seven keys of a key block KB-2 are other-page-incoming indication keys capable of displaying incoming of some information to a line registered at a page other than the page being currently displayed or selecting and displaying incoming of some information to some lines out of lines not registered at any pages.

A key block KB-3 is a key block of function keys, and various functions can be optionally set in each talking terminal (DB) 1 according to data.

A key block KB-4 has at its left end a menu key to display an index screen for changing over said line display screens of 38 screens to select a desired line display screen out of them by a one-touch operation, and comprises direct-changeover keys "STATUS" for directly changing over line display screens, a title changeover key for changing over said direct-changeover keys themselves in order, and the like.

A message area MA-1 is an information display area, and displays a dial monitor, a dial number of automatic dialing, data of an opposite party, an opposite party's name and the like, and the example of FIG. 3 displays the date and hour, and the number of a talking terminal (DB) 1 in an unused state.

The page number and name of the displayed screen are displayed at the bottom of the message area MA-1.

Figure 4:
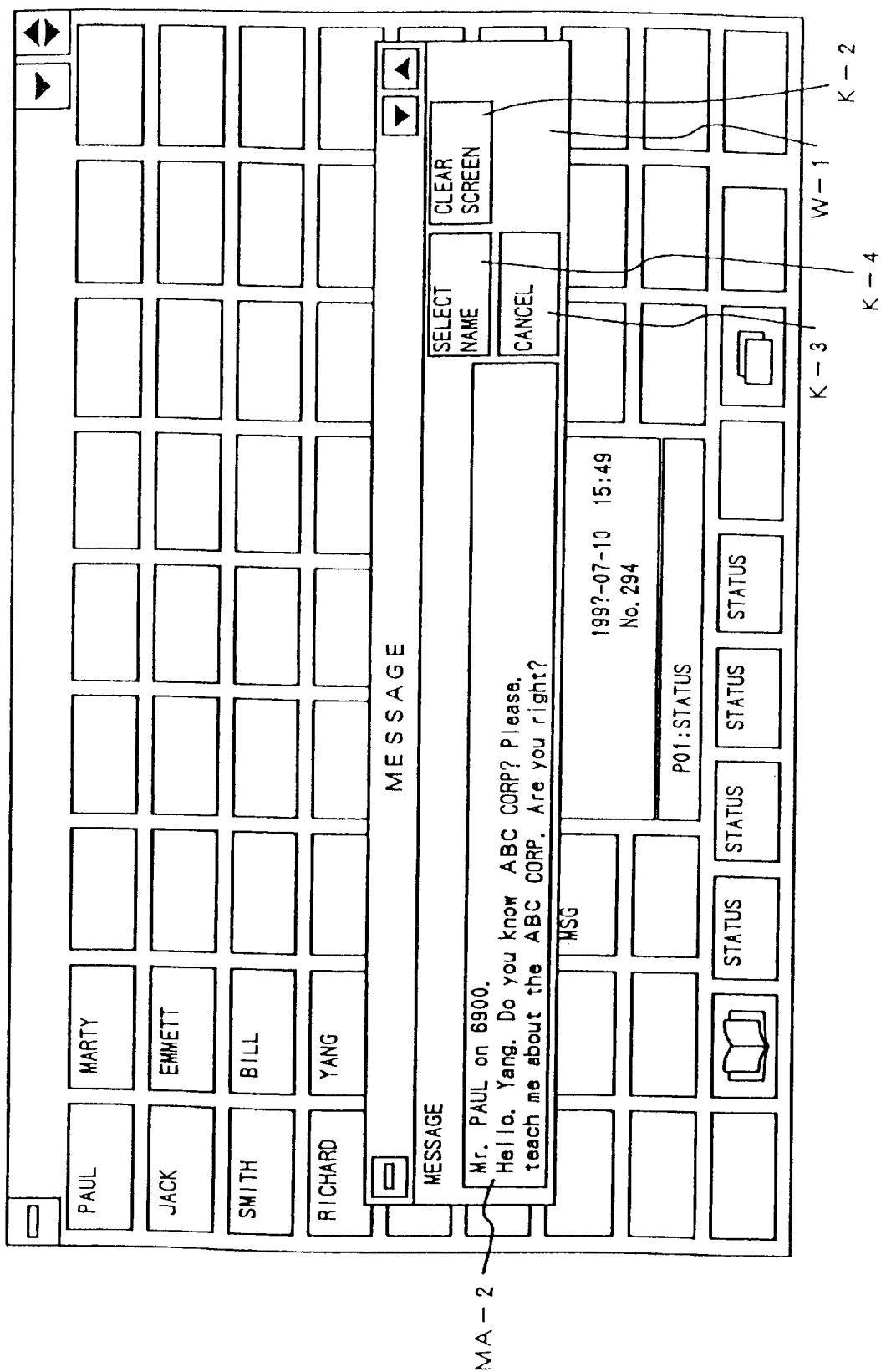
FIG. 4 is an explanatory figure showing a display screen of a display of a talking terminal in a state of transmitting an electronic mail.

A key K-1 is an "MSG" key for changing over to an electronic mail transmission screen, and when this key of a talking terminal attempting to transmit a message, for example, a talking terminal (DB) 1 is clicked by a mouse 1-30 which is a pointing device, a window W-1 of FIG. 4 appears.

This window W-1 is an electronic mail transmission screen, and a message area MA-2 displays a message inputted from a keyboard 1-28.

A "CLEAR SCREEN" key K-2 in the window W-1 is a key for clearing all the content of the message area MA-2, a "CANCEL" key K-3 is a key for canceling transmission of a message, and a "SELECT NAME" key K4 is a key for selecting the opposite party which a message is to be sent to.

Figure 5:
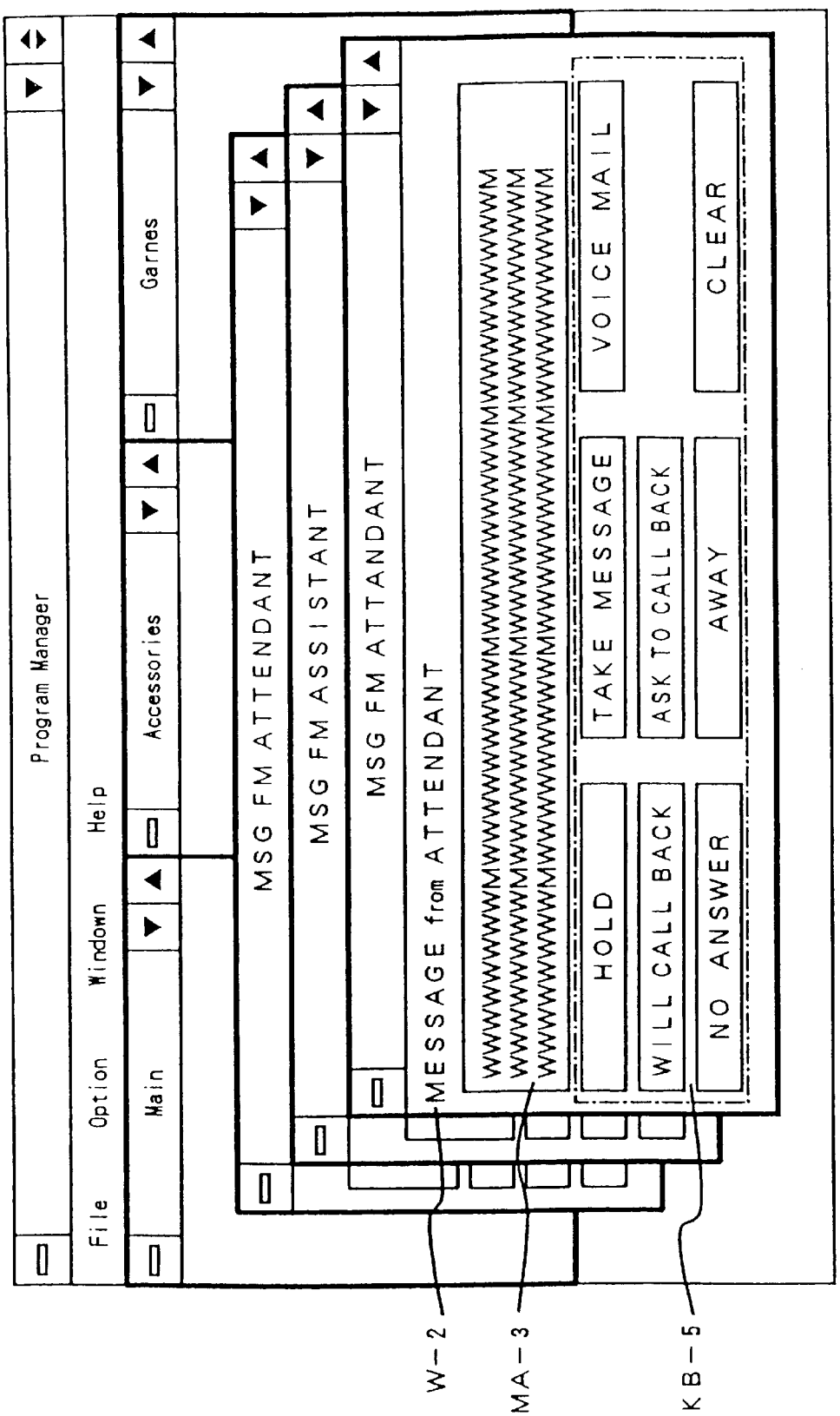
FIG. 5 is an explanatory figure showing a display screen of a display of a talking terminal in a state of receiving an electronic mail.

FIG. 5 shows an electronic mail reception window W-2 which is displayed when a talking terminal at a called side, for example, a talking terminal (DB(B)) 1 has received a message.

The window W-2 is provided with a message area MA-3 for displaying a message inputted into the message area MA-2 of FIG. 4 and a key block KB-5 for function keys dedicated to the electronic mail reception window W-2.

Ordinarily, the talking terminal (DB(B)) 1 side which has received a message does not inputs a reply message from the keyboard 1-28, but selects and clicks one of keys in the key block KB-5 by means of the mouse 1-30 which is a pointing device.

The talking terminal (DB(B)) 1 side identifies the clicked key, converts the key information into a message prepared in advance corresponding to the key, and returns the message to the talking terminal (DB(A)) 1.

Figure 6:
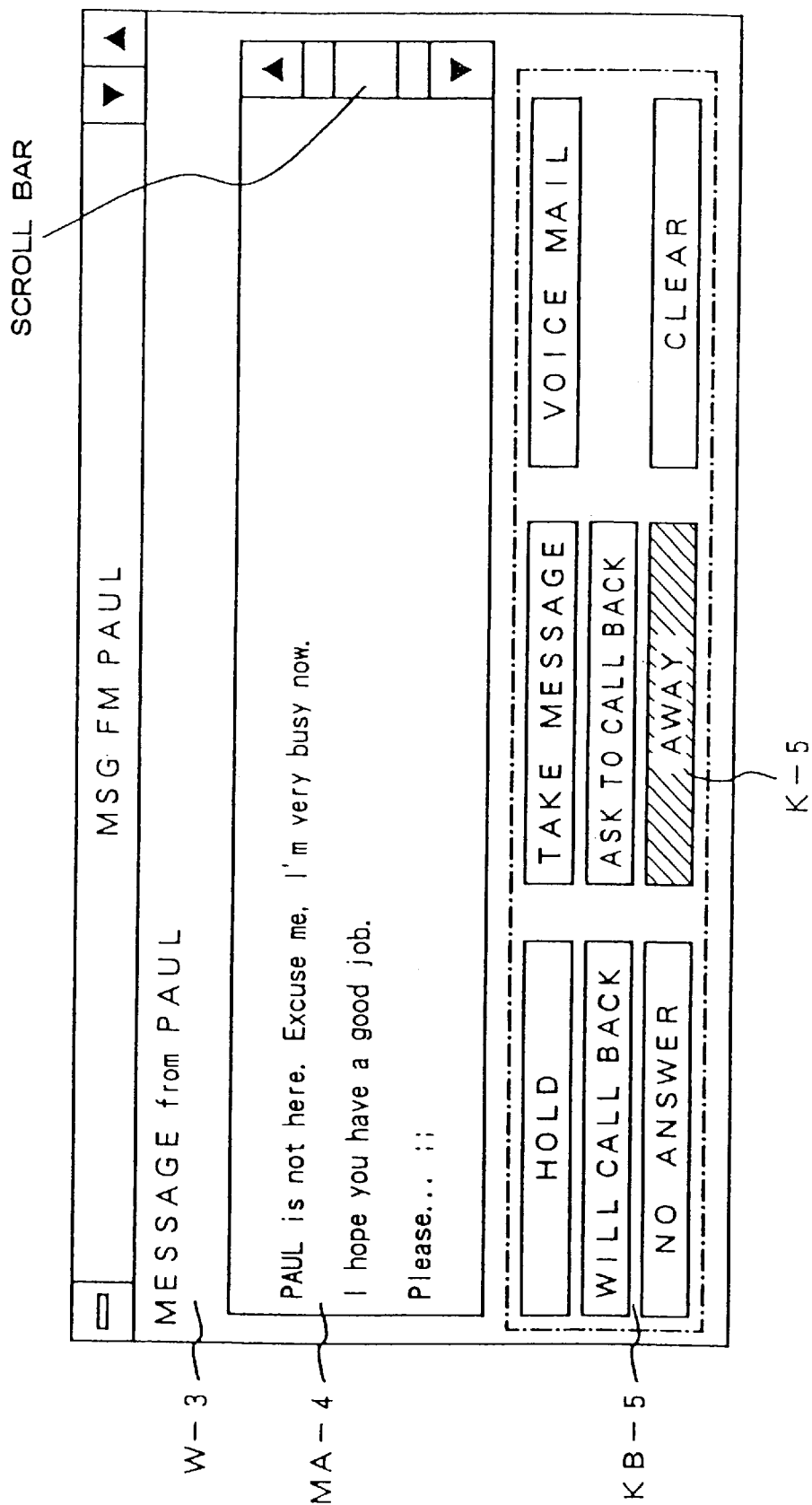
FIG. 6 is an explanatory figure showing a display screen of a display of a talking terminal in a state of receiving a reply electronic mail.

FIG. 6 is a reply electronic mail display window W-3 of the talking terminal (DB(A)) 1 for displaying the message returned from the talking terminal (DB(B)) 1, wherein a message area MA-4 is a display area for displaying a reply message and a key block KB-5 displays the same function keys as the key block KB-5 of FIG. 5.

At this time, in the key block KB-5 of FIG. 6, the lamp of a function key clicked in the talking terminal (DB(B)) 1 is also turned on in the talking terminal (DB(A)) 1 and the reply can be known without reading the message. FIG. 6 indicates that a function key "AWAY" of the talking terminal (DB(A)) 1 had been turned on in case that a function key "AWAY" was selected in the talking terminal (DB(B)) 1, and a message corresponding to this is displayed in the message area MA-4.

Figure 7:
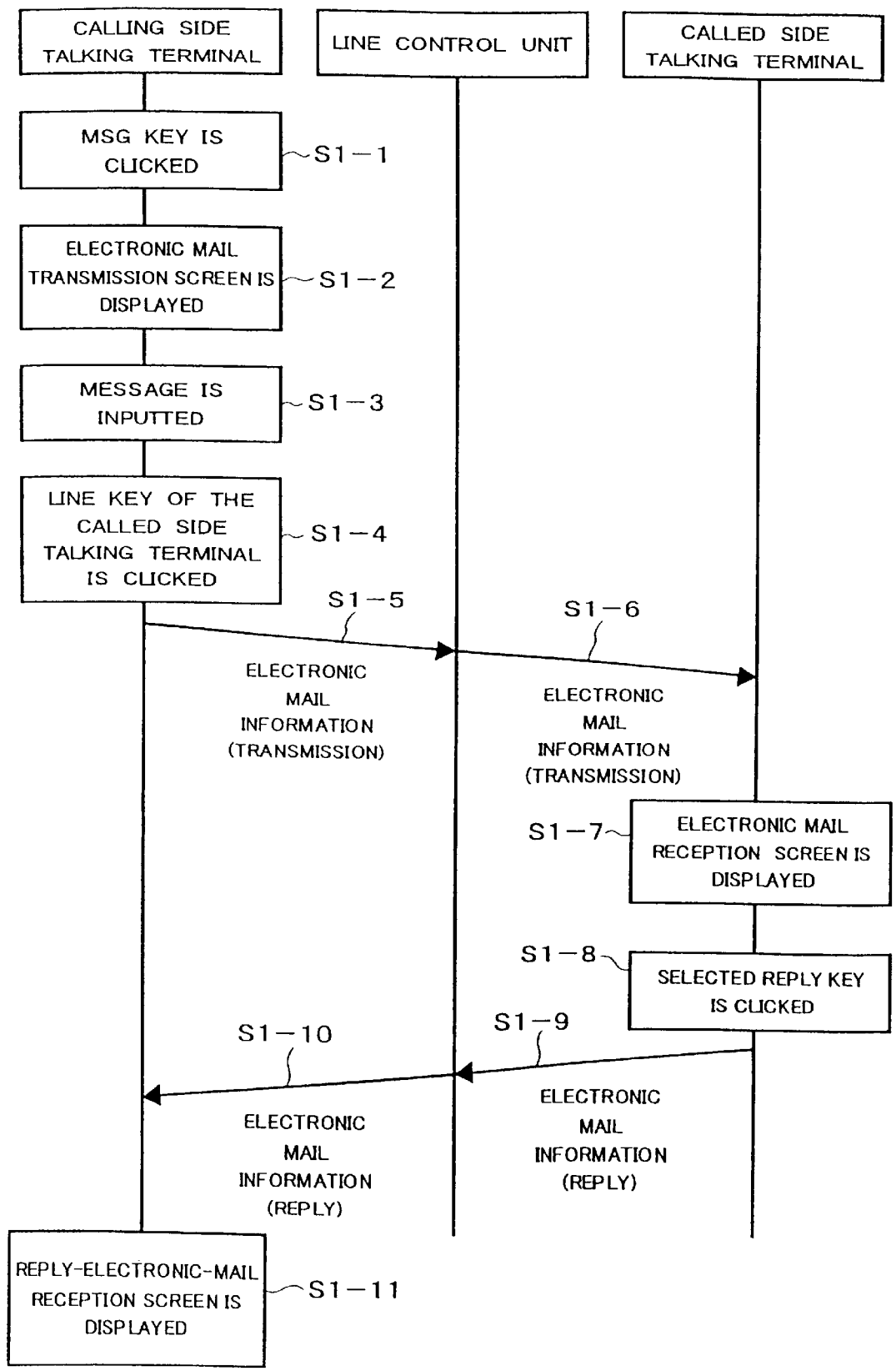
FIG. 7 is a sequence chart showing operations among a calling side talking terminal, a line control unit and a called side talking terminal which take part in an electronic mail pop-up control.

FIG. 7 is a sequence diagram showing operation among a calling side talking terminal (DB(A)) 1, a line control unit 2 and a called side talking terminal (DB(B)) 1 which take part in an electric mail pop-up control.

First, in the calling side talking terminal (DB(A)) 1, when the "MSG" key is clicked by the mouse of FIG. 3 (S1-1), the electronic mail transmission screen of FIG. 4 is displayed (S1-2).

Using this screen, a message is inputted into the message area MA-2 of FIG. 4 from the keyboard 1-28 (S1-3). Following this, the key "SELECT NAME" is clicked by the mouse and a line key "PAUL" is clicked (S1-4).

The microprocessor unit (MPU) 1-20 refers data of the hard disk (HD) 1-33 through the hard disk drive (HDD) 1-32 and converts the line key "PAUL" to a telephone number 6900, and sends this number to the line control unit (LCU) 2, using a D channel along a path passing the bus 1-36, the ISA bus 1-18, the interface (PCI/F) 1-16 with the ISA bus, the dual port RAM (DPRAM) 1-15, the bus 1-17, the serial communication receiver/transmitter (USART1) 1-06, the data transfer LSI (P-PLSI) 1-09 and the digital talking terminal line circuit (DBDLIN) 5.

In the line control unit (LCU) 2, the central processing equipment (CPE) 10 controls the time-division switch (TSW) 11 to connect to each other the line circuit (DBDLIN) 5 of the calling side talking terminal (DB(A)) 1 and the line circuit (DBDLIN) 5 of the called side talking terminal (DB(B)) 1.

Since a B channel is also connected between the talking terminals by this, a message and control information from the talking terminal (DB(A)) 1 are sent to the talking terminal (DB(B)) 1 by control of the microprocessor units (MPU) 1-20 and 1-01 along a path passing the bus 1-36, the ISA bus 1-18, the interface (PCI/F) 1-16 with the ISA bus, the dual port RAM (DPRAM) 1-15, the bus 1-17, the serial communication receiver/transmitter (USART0) 1-05, the communication rate adoption LSI (RA-LSI) 1-07, the rate converter 1-08, the data transfer LSI (P-PLSI) 1-09, the digital talking terminal line circuit (DBDLIN) 5, the time-division switch (TSW) 11, and the digital talking terminal line circuit (DBDLIN) 5 of the talking terminal (DB(B)) 1.

In the talking terminal (DB(B)) 1, said message and control information are sent as electronic mail information to the microprocessor unit (MPU) 1-20 through a path inverse to the transmission path in the talking terminal (DB(A)) 1 (S1-5 and S1-6). When the transmission has ended, connection between the calling side talking terminal (DB(A)) 1 and the called side talking terminal (DB(B)) 1 is released.

The microprocessor unit (MPU) 1-20 of the talking terminal (DB(B)) 1 pops up the window W-2 of FIG. 5 on the display 1-26, and displays the received message (S1-7).

When the dealer of the talking terminal (DB(B)) 1 clicks a reply key, for example, "AWAY" by means of the mouse 1-30 (S1-8), the clicked key is converted into a message corresponding to the key by control of the microprocessor unit (MPU) 1-20, and the message is connected to the talking terminal (DB(A)) 1 through a path reverse to said path of connection from the talking terminal (DB(A)) 1 to the talking terminal (DB(B)) 1 on the basis of the information of the calling party. It is assumed that various definite-form reply messages are in this talking terminal (DB) 1 and a desired definite-form message is selected by clicking a reply key by means of the mouse 1-30.

The converted message is returned together with the key information as electronic mail information to the microprocessor unit (MPU) 1-20 of the talking terminal (DB(A)) 1 through a path reverse to said path (S1-9 and S1-10).

The microprocessor unit (CP) 1-20 of the talking terminal (DB(A)) 1 pops up the window W-3 shown in FIG. 6 on the display 1-26, and displays the message and turns on the key "AWAY" (S1-11).

Figure 8:
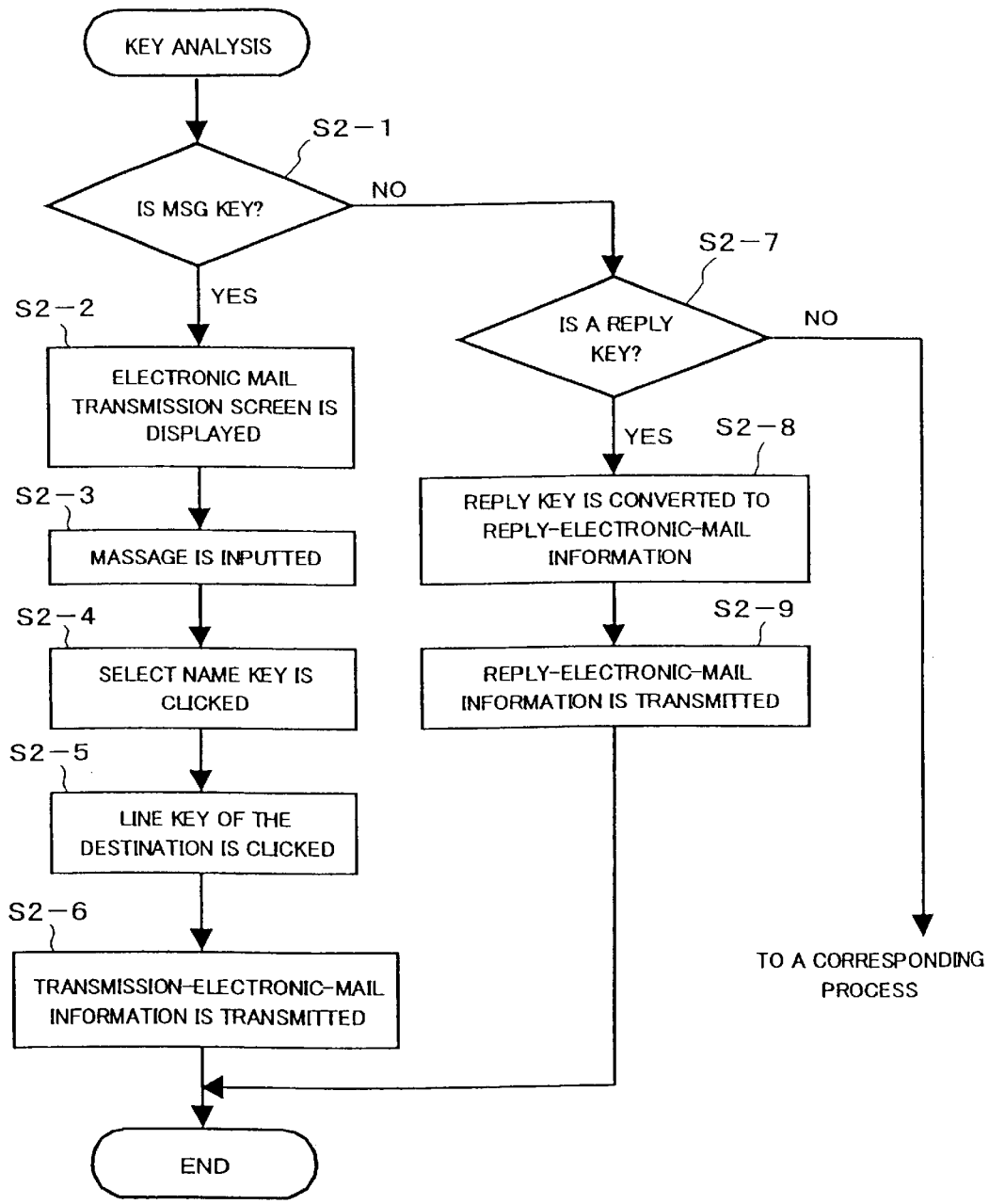
FIG. 8 is a flowchart showing a processing operation of an information processing unit of a talking terminal, particularly, a processing operation of an MPU in a key analyzing process following transmission or reception of an electronic mail.

FIG. 8 is a flowchart showing a processing operation of the MPU 1-20, particularly in a key analyzing process following transmission and reception of an electronic mail, of the information processing unit (PCCPU) 1-2 of the talking terminal (DB(A)) 1.

When one of keys on the display 1-26 is clicked by the mouse 1-30 which is a pointing device, the microprocessor unit (MPU) 1-20 performs a key analysis.

First, the MPU 1-20 determines whether or not the message key "MSG" has been clicked (S2-1). If the MSG key has been clicked, the MPU 120 pops up and displays the electronic mail transmission screen (see FIG. 4) on the display (S2-2).

A sender of an electronic mail inputs a message from the keyboard 1-28 (S2-3), and the MPU 1-20 displays this message on the electronic mail transmission screen.

The electronic mail sender clicks the "SELECT NAME" key (S2-4) and thereby notifies the microprocessor unit MPU) 1-20 that a destination is about to be indicated, and then clicks with the mouse 1-30 a line key on which the name of a called party which is the destination is displayed (S2-5).

The microprocessor unit (MPU) 1-20 converts the clicked line key into a called party's number and sends it to the line control unit (LCU) 2. The line control unit (LCU) 2 connects through the time-division switch (TSW) 11 the calling talking terminal, for example, a talking terminal (DB(A)) 1 and the called side talking terminal, for example, a talking terminal (DB(13)) 1 to each other.

When the connection has been completed, the microprocessor unit (MPU) 1-20 transmits electronic mail information composed of a message and control information to the talking terminal (DB(B)) 1 which is the destination (S2-6).

And when the called side talking terminal (DB(B)) 1 which has received this electronic mail information performs a reply, a reply key is clicked. In this case, in the same way as the processing operation of the MPU 1-20 of the calling side talking terminal (DB(A)) 1 shown in FIG. 8, the MPU 1-20 of the called side talking terminal (D)B(B)) 1 determines whether or not the MSG key has been clicked in S2-1, and if the MSG key has not been clicked, this MPU 1-20 determines whether or not a reply key has been clicked (S2-7).

If a reply key has been clicked, the microprocessor unit (MPU) 1-20 converts the clicked reply key to a reply message corresponding to it and displays the reply message on a display area of the window (S2-8).

Furthermore, the MPU 1-20 generates reply-electronic-mail information on the basis of this reply message and transmits this reply-electronic-mail information to the calling side talking terminal (DB(A)) 1 (S2-9).

Figure 9:
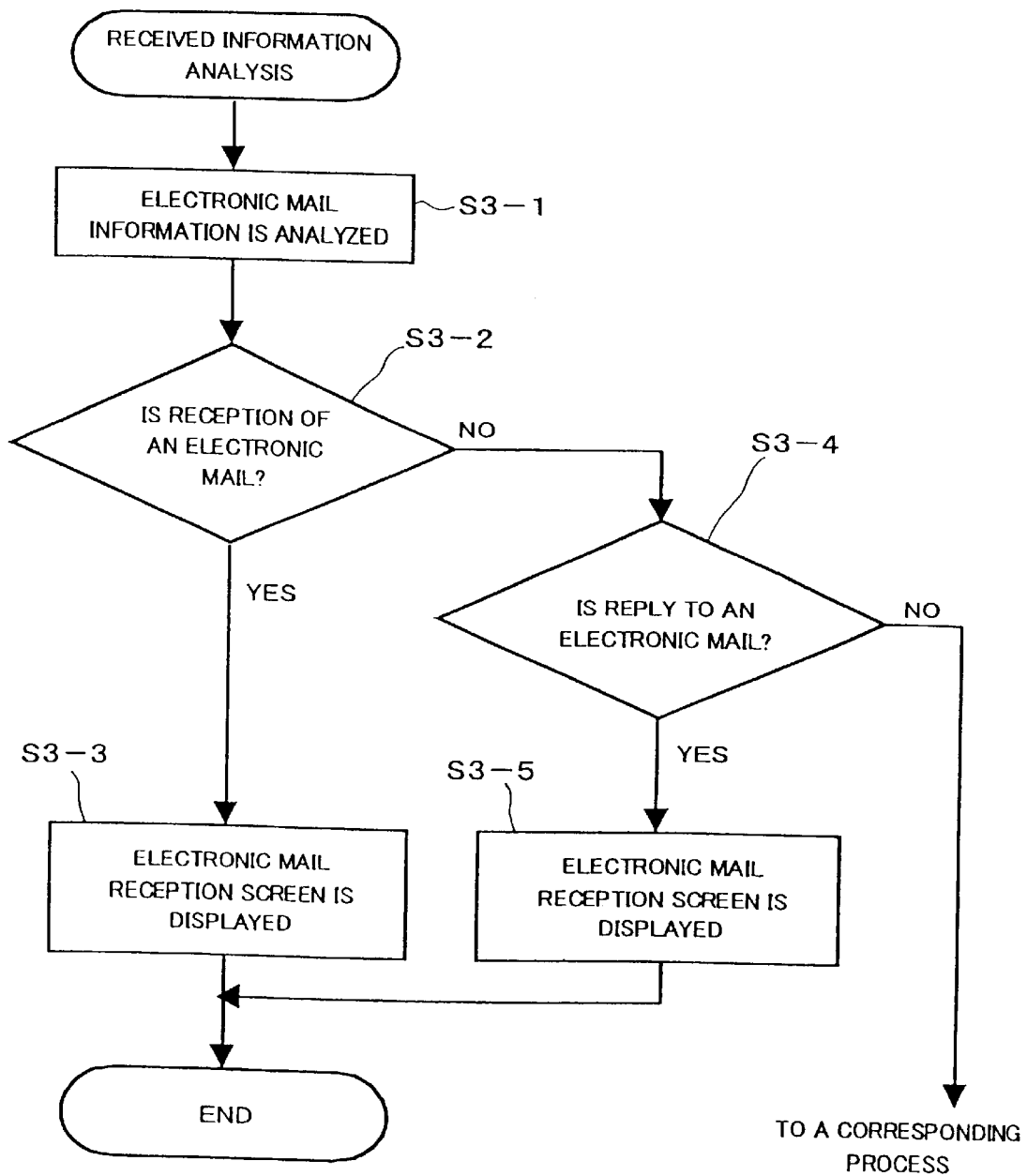
FIG. 9 is a flowchart showing a processing operation of an information processing unit of a talking terminal, particularly, a processing operation of an MPU in a received information analyzing process following a pop-up display operation of an electronic mail.

And FIG. 9 is a flowchart showing a processing operation of the MPU 1-20, particularly in a received information analyzing process following pop-up-displaying of electronic mail information, of the information processing unit (PCCPU) 1-2 of a talking terminal (DB) 1.

For example, when the MPU 1-20 of the talking terminal (DB) 1 receives electronic mail information, it performs a reception analysis of the electronic mail information (S3-1), and determines whether or not this electronic mail information is for reception (S3-2). If this electronic mail information is for reception, the MPU 1-20 pops up and displays the electronic mail reception screen (see FIG. 5) (S3-3).

If this electronic mail information is not for reception, it further determines whether or not this electronic mail information is for reply (S3-4). If this electronic mail information is for reply, it pops up and displays the reply-electronic-mail reception screen (see FIG. 6) (S3-5).

By doing in such a way, the MPU 1-20 can determine whether electronic mail information is for reception or for reply, and can automatically display it on the respective reception screens.

According to this embodiment, therefore, in an electronic mail for connection between talking terminals (DB) 1, when an electronic mail has come into the called side talking terminal (DB) 1 from the calling side talking terminal (DB) 1, even without performing any operation the called side talking terminal (D)B) 1 pops up and displays the electronic mail reception window W-2 on the display 1-26 and displays a message as the electronic mail from the calling side talking terminal (DB) 1, and therefore it is possible to completely prevent that a called party suffers loss of an opportunity due to a fact that the called party has overlooked blinking of a message lamp or has performed a message key operation too late, and it is possible to remarkably reduce a burden on a dealer who is a called party performing a transaction fighting the clock.

Furthermore, according to this embodiment, since each of talking terminals store several kinds of definite-form reply messages in it, a dealer who is a user of the called side talking terminal (DB) 1 can save a trouble of inputting massages as various reply electronic mails by click-selecting a reply key, and thanks to this it is possible to remarkably reduce a burden on a dealer who is a called party.

Still further, according to this embodiment, when the calling side talking terminal (DB) 1 receives a message as a reply electronic mail from the called side talking terminal (DB) 1, without performing any operation the calling side talking terminal (DB) 1 pops up and displays the electronic mail reply window W-3 on the display 1-26 and displays a message as the reply electronic mail in this electronic mail reply window W-3, and therefore, the caller who is a user of the calling side talking terminal can also read the reply electronic mail without performing a key operation, and it is possible to reduce a burden on a dealer (caller) who has originated an electronic mail.

UTILIZABILITY IN INDUSTRY

When an electronic mail has come in from a calling side talking terminal in an electronic mail system for connection between talking terminals, an electronic mail pop-up control system according to the present invention pops up and displays an electronic mail reception window on the display and displays a message as an electronic mail in this window even if the called side talking terminal does not perform any operation, and therefore said control system is suitable for a talking terminal in a dealing system used when a bank or a securities company performs a financial transaction of exchange, securities and the like, said dealing system being required to quickly and securely transfer an important electronic mail to a dealer of a taking terminal.

What is claimed is:

1. An electronic mail pop-up control system comprising a plurality of talking terminals and a line control unit for communication-connecting with said plurality of talking terminals, wherein each of said plurality of talking terminals comprises:
  message input means for inputting a message; and
  display means for displaying various messages including a line display screen to display a communication-connection operation key and a message input request key, wherein a first talking terminal of said plurality of talking terminals comprises:
  message input request key recognition means for recognizing a key operation of said message input request key in said line display screen;
  electronic mail input means for, when said message input request key recognition means recognizes a key operation of said message input request key, displaying an electronic mail input request key, displaying an electronic mail input display window on said line display screen and inputting a message inputted by said message input means in said electronic mail input display window; and
  transfer means for transferring the message inputted by said electronic mail input means to a second talking terminal of said plurality of talking terminals;

wherein said second talking terminal comprises:
  reception means for receiving the message transferred from said first talking terminal;
  electronic mail display means for, when said reception means receives said message while said display means displays said line display screen, automatically pop-up displaying an electronic mail display window on said line display screen and displaying the message received by said reception means in the electronic mail display window;
  storage means for storing a plurality of previously-set reply messages;
  reply message selection display means for displaying a plurality of select keys corresponding to each of said plurality of reply messages in said electronic mail display window;
  selection means for selecting a desired select key out of said plurality of select keys displayed in said electronic mail display window by said reply message selection display means; and
  reply means for, when said selection means selects a desired select key, automatically transferring to said first talking terminal the reply message corresponding to the select key selected by the selection means.

2. An electronic mail-pop-up control system according to claim 1, wherein said first talking terminal comprises:
  reception means for receiving the reply message transferred from said second talking terminal; and
  reply mail display means for, when said reception means receives said reply message while said display means displays said line display screen, automatically pop-up displaying the electronic mail display window at the forefront of said line display screen, and displaying the reply message received by said reception means in the electronic mail display window.

3. A method for sending electronic messages between a first talking terminal and a second talking terminal, comprising:

operating a first key of the first talking terminal to obtain an electronic message transmission screen on a display of the first talking terminal;

typing in data onto the electronic message transmission screen, by way of a keyboard of the first talking terminal;

operating a second key of the first talking terminal to select the second talking terminal as a called terminal;

operating a third key of the first talking terminal to send a first electronic message corresponding to data entered onto the electronic message transmission screen to the second talking terminal;

receiving the first electronic message at the second talking terminal;

automatically displaying the first electronic message on a display screen of the second talking terminal without any prior key operation being entered at the second talking terminal to display the first electronic message;

operating a first key of the second talking terminal to reply to the first electronic message;

outputting a predefined electronic message, as a second electronic message, as well as information as to the first key of the second talking terminal being operated, to the first talking terminal; and popping up a display screen at the first talking terminal to display the second electronic message without any prior key operation being entered at the first talking terminal to display the second electronic message, and notifying a user at the first talking terminal of the operating of the first key of the second talking terminal by illuminating a corresponding key at the first talking terminal while the second electronic message is displayed on the display screen at the first talking terminal.

* * * * *